United States Patent [19]

Leemhuis

[11] 4,147,298
[45] Apr. 3, 1979

[54] FLUID FLOW CONTROLLER

[75] Inventor: Louis J. Leemhuis, 1855 Sherington Pl., Apt. M214, Newport Beach, Calif. 92663

[73] Assignee: Leemhuis, Louis J., Newport Beach, Calif.

[21] Appl. No.: 880,299

[22] Filed: Feb. 22, 1978

Related U.S. Application Data

[63] Continuation-in-part of Ser. No. 711,066, Aug. 2, 1976, abandoned.

[51] Int. Cl.² .................................................. F24F 7/06
[52] U.S. Cl. ........................................ 236/49; 73/228; 137/499
[58] Field of Search .................. 236/49; 137/486, 489, 137/499; 73/228

[56] References Cited

U.S. PATENT DOCUMENTS

| | | | |
|---|---|---|---|
| 2,803,261 | 8/1957 | Carlson | 137/499 X |
| 2,857,762 | 10/1958 | Parshall et al. | 73/228 |
| 3,809,314 | 5/1974 | Engelke et al. | 236/49 |
| 3,976,244 | 8/1976 | Logsdon | 236/49 |
| 3,994,434 | 11/1976 | Boyer et al. | 236/49 |
| 4,077,567 | 3/1978 | Ginn et al. | 236/49 |

Primary Examiner—William F. O'Dea
Assistant Examiner—William E. Tapolcai, Jr.
Attorney, Agent, or Firm—Poms, Smith, Lande, Glenny & Rose

[57] ABSTRACT

A fluid flow controller is disclosed particularly adapted for maintaining a variable value constant volume fluid flow through a conduit supplying fluid to a zone. A spring biased vane is disposed across the diameter of the conduit to provide a motion signal proportional to the average volume flow pressure across the diameter of the conduit. The motion signal from the vane and a transducer within a zone to which the fluid is being conducted responsive to an environmental parameter in the zone are connected to a controller assembly connected to control an actuator moving a damper within the conduit. The controller is adapted to position the damper to maintain the motion signal from the vane and the signal from the transducer within the controlled zone in balance.

15 Claims, 10 Drawing Figures

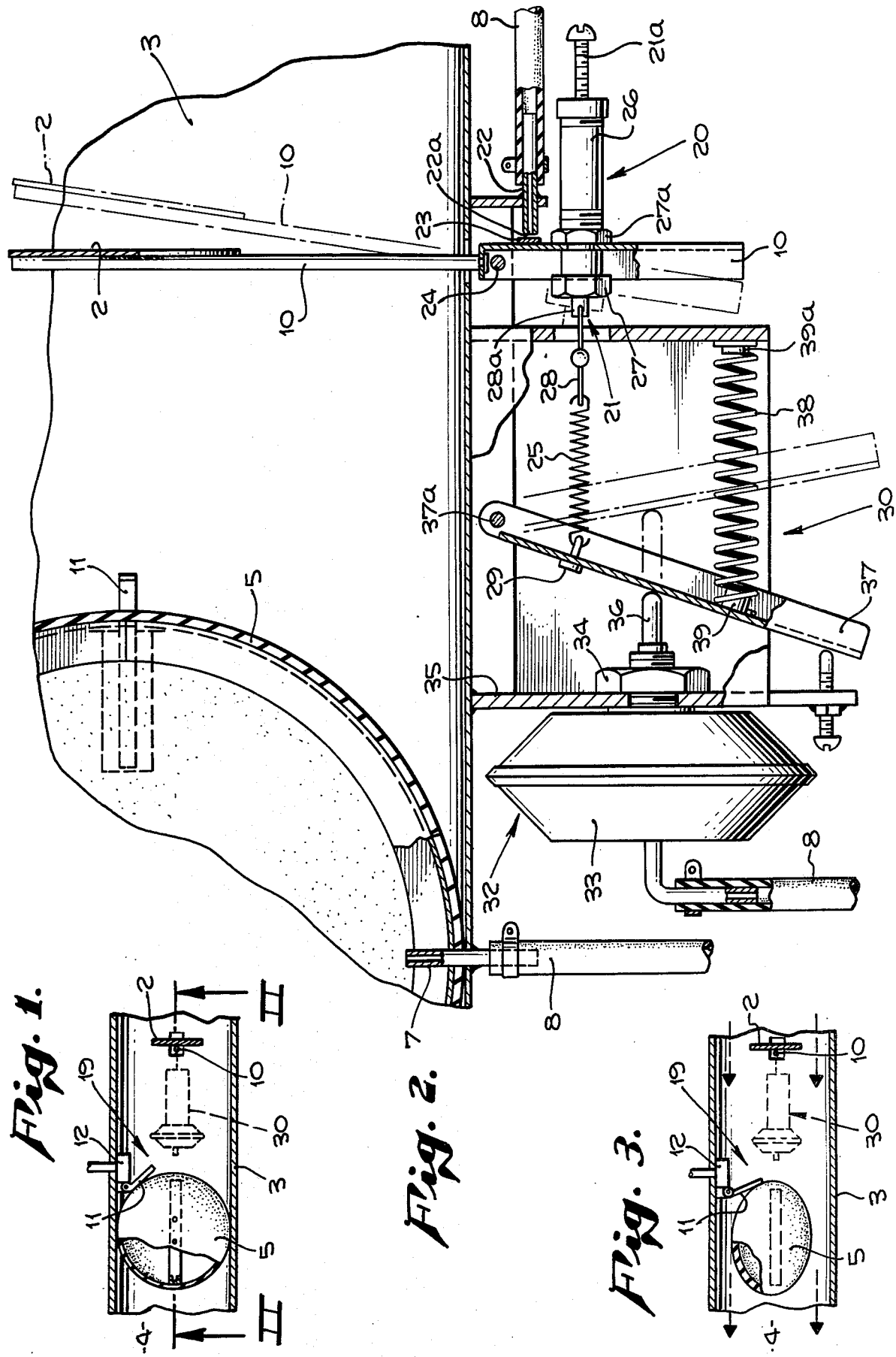

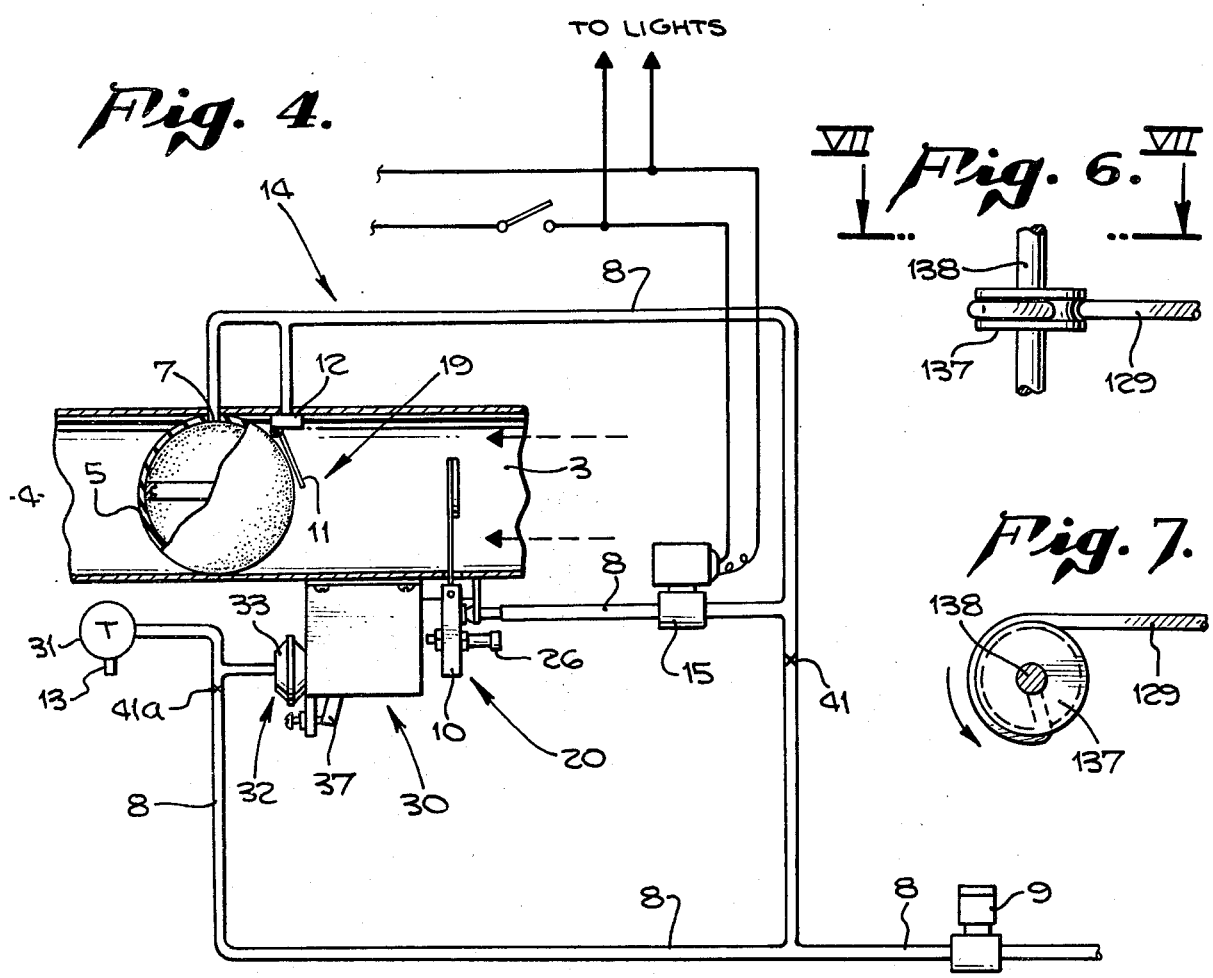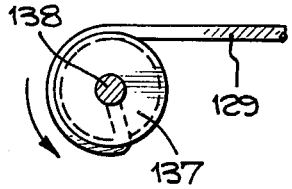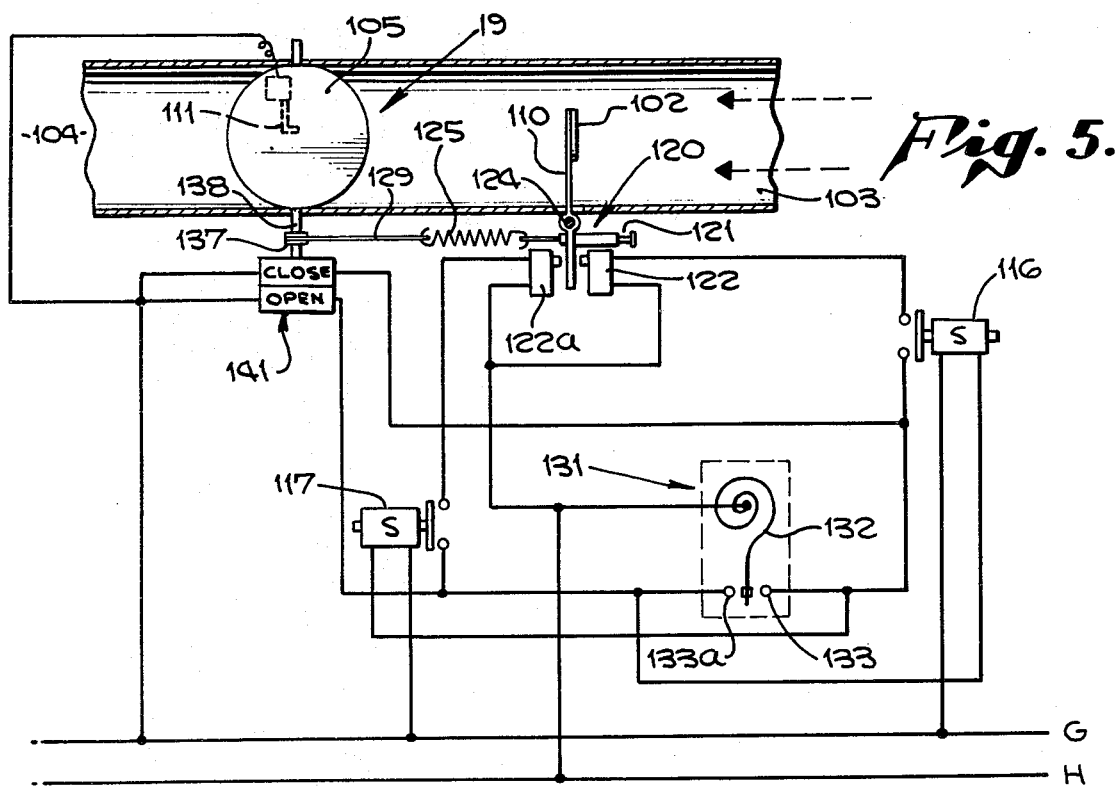

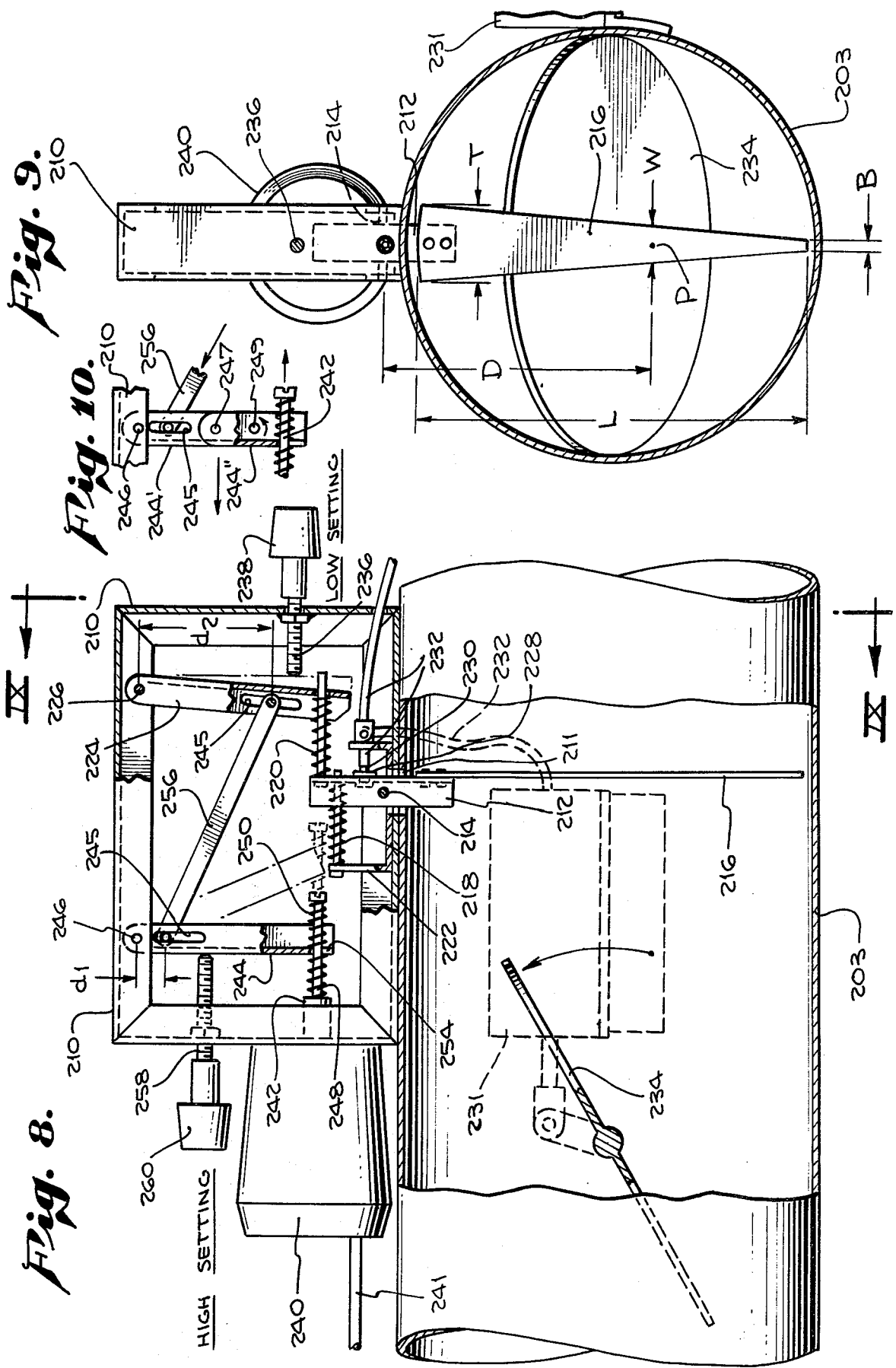

FLUID FLOW CONTROLLER

This is a continuation-in-part of application Ser. No. 711,066 filed Aug. 2, 1976, now abandoned.

BACKGROUND OF THE INVENTION

The present invention relates to fluid flow controllers for fluid conduits and in particular to flow controllers adapted to control the flow of fluid through a conduit to a zone at a selectable constant volume value which can be varied in response to feedback from changes in the zone caused by the flow of fluid thereto.

In large environmental air conditioning systems, a problem exists in maintaining many zones within the environment at a desired temperature by means of heated or cooled air from a common source. Various pressure drops are caused within the conduits connecting the fluid (air) source to the many outlets within the environment.

Heretofore, the problem of maintaining a zone at a desired temperature by means of a controlled fluid flow into the zone has been solved in one of two basic manners. First, as shown in U.S. Pat. No. 3,227,369 for example, the proportions of hot and cold input fluid flowing into the zone can be thermostatically controlled. The aforementioned pressure drops within the system still cause variations in zone temperature with such an approach. Dampers can be added in the various conduits at points adjacent each zone to be controlled with a transducer (i.e. a thermostat) controlling each damper disposed within the zone to be controlled by the particular conduit. Additionally, the temperature mixing operation can be performed at a plurality of sites disposed throughout the environment to be controlled. All of the foregoing leads to an increasingly complex and costly system which, in turn, tends towards malfunction because of the complexity thereof.

The second approach is a more simplified approach well known in the art for many years. According to this technique, a single temperature fluid is provided in variable volumes to the zones to be controlled.

Until recently, the older approach of providing a single temperature fluid at variable fluid flow volumes was found objectionable as a non-constant volume flow rate of fluid supplied to a zone not only caused undesirable changes in the noise level of the device, but also prevented properly supplying the zone with fresh fluid in a uniform manner. In the recent U.S. Pat. No. 3,809,314, Engelke et al described a self-powered variable volume air damper control adapted "to regulate volume flow of air from a duct into a conditioned space solely as a function of a sensed condition regardless of air supply pressure". According to the teaching of Engelke et al, a tube is installed facing into the duct supplying the flowing fluid to the zone so as to develop a source of air pressure used to expand a bellows connected to a damper within the duct. An orifice plate is disposed in the duct with a differential pressure transducer connected across the orifice plate so as to respond to the static pressure drop across the orifice plate caused by the flow of fluid therethrough. The differential pressure transducer and a thermostat are each connected to control the bleed rate of air pressure out of the bellows whereby the flow through the duct of fluid is controlled as a combination function of the static pressure of the fluid, the flow rate of the fluid through the orifice plate, and the temperature within the zone. While tending towards solving the problems attendant the former non-constant volume flow rate installations of such air conditioning apparatus, the apparatus of Engelke et al presents shortcomings of its own. First, the differential pressure transducer does not measure fluid flow rate within the duct directly. That is, it estimates fluid flow rate as a function of the differential pressure drop across the orifice plate. As such, it is prone to inaccuracies due to positioning of the orifice plate, positioning of the openings into the duct supplying the differential pressure transducer, boundary layer effects of the fluid flow through the conduit, and eddy currents within the conduit, just to name a few. Additionally, such an approach provides two additional problems. First, it forces the use of a constant volume regulator (item 33 in the single figure). Second, it takes at least one inch of system pressure to operate the bellows controlling the damper. In light of the energy conservation programs presently in effect, systems operating at 10 percent of the minimum required pressure for operation of the Engelke et al apparatus (i.e. 1/10 inch of system pressure) are more desirable.

Wherefore, it is the object of the present invention to provide a fluid flow controller for fluid conduits able to maintain a variable value constant volume fluid flow through the conduit operable at low system pressures and responsive to true average volume flow across the diameter of the conduit through which the fluid flow is being controlled.

SUMMARY

The foregoing objectives have been accomplished by the present invention for use in fluid flow apparatus having a conduit for conducting flowing fluid, a movable damper disposed within the conduit for varying the cross-sectional area of the conduit, and an actuator connected to the damper for opening the damper to increase the cross-sectional area of the conduit and closing the damper to decrease the cross-sectional area of the conduit, by apparatus for maintaining the volume of fluid flowing through the conduit constant comprising a vane disposed across the diameter of the conduit adapted for movement from an at-rest position in a first direction as a function of the average force across the diameter of the conduit of the fluid flowing therethrough; bias means connected to the vane for biasing the vane in a second direction opposite the first direction by a preselected amount of force whereby the vane will be disposed in the at-rest position when the average force of the flowing fluid across the diameter of the conduit on the vane is less than the bias force; and, controller means having means for designating the desired flow volume through the conduit, means for sensing the position of the vane, and an output connected to the damper for opening the damper when the fluid flow is less than the desired flow volume and for closing the damper when the fluid flow is greater than the desired flow volume whereby the average flow volume across the diameter of the conduit of the fluid through the conduit is maintained equal to the desired flow volume. As applied to controlling a variable within a controlled zone fluctuating as a function of the fluid flow, the means for designating the desired flow volume through the conduit is adjustable and adapted for connection to and adjustment by a transducer responsive to the variable fluctuating as a function of the volume of fluid flow through the conduit. To provide flow averaging in the preferred embodiment, the vane is adapted for pivotal movement about an axis normal to the longitudinal axis of the conduit disposed adjacent the wall of the conduit; and, the vane is tapered in a plane passing through the axis of rotation to be wider adjacent the axis of rotation such that the product of the distance from the axis of rotation to any point on the vane times the width of the vane at the point is a constant whereby the flowing fluid across the diameter of the conduit tends to rotate the vane with constant mechanical advantage to produce rotation of the vane as a result of the average fluid flow across the diameter of the conduit.

DESCRIPTION OF THE DRAWINGS

FIG. 1 is a side sectional view of a fluid conduit being controlled by one alternate embodiment of the present invention shown in a fully closed position.

FIG. 2 is a side sectional view taken through the plane II—II of FIG. 1 showing in detail the constant volume flow means of the alternate embodiment of the present invention shown in FIG. 1.

FIG. 3 is a side sectional view of a fluid conduit showing the constant volume flow control means of the alternate embodiment of FIG. 1 in a partially closed position.

FIG. 4 is a schematic view of the variable value constant volume fluid flow control means of the embodiment of FIG. 1 which is, specifically, a pneumatic embodiment thereof.

FIG. 5 is a schematic view of the apparatus of the present invention in a second alternate embodiment adapted for electrical operation.

FIG. 6 is a detailed view of the cable mounting wheel employed in the embodiment of FIG. 5 of the present invention.

FIG. 7 is a detailed view of the cable mounting wheel of FIG. 6 in the plane VII—VII.

FIG. 8 is a side sectional view of a fluid conduit being controlled by the preferred embodiment of the present invention.

FIG. 9 is an end elevation of the apparatus of FIG. 8 in the plane IX—IX.

FIG. 10 is an alternate configuration of the swing arm employed in the preferred embodiment of the present invention.

DESCRIPTION OF THE PREFERRED AND ALTERNATE EMBODIMENTS OF THE PRESENT INVENTION

Prior to describing the preferred embodiment of the present invention, two alternate embodiments will be described disclosing the basic mode of operation of the present invention as applied to both pneumatic and electrical operation thereof.

Referring first to FIGS. 1 and 3, simplified sectional views of a fluid conduit 3 which supplies fluid to a zone 4 are shown. A variable value constant volume fluid flow controller is shown which comprises constant volume flow control means, indicated generally at 19, for controlling the flow of fluid through conduit 3 at a selectable constant volume value of fluid flow to zone 4. Constant volume fluid flow control means 19 is shown in a completely closed configuration in FIG. 1 which would prevent all fluid flow through conduit 3. In FIG. 3, it is shown in a partially opened configuration which would allow some fluid (as represented by the dashed arrows) to pass through conduit 3 to zone 4.

Referring now to the detailed drawing of FIG. 2, constant volume fluid control means 19 comprises a pressure plate 2 mounted on an arm 10 for sensing the flow pressure of fluid passing through conduit 3 and associated damper means 5. As the fluid flow pressure on pressure plate 2 increases with an increase in fluid flow velocity from right to left, pressure plate 2 is forced from right to left and associated arm 10 is rotated counter-clockwise thereby about pivot 24. As will be explained in greater detail hereinafter, such movement of arm 10 is used for operating the damper means 5 to restrict the flow of fluid through conduit 3, as may best be seen with reference to FIGS. 1-4. In the present exemplary embodiment, damper means 5 comprises a pneumatically inflatable elastic ball, but other dampers may be used as exemplified in other embodiments which follow hereinafter. Damper control means, shown generally at 20, are provided for controlling the operation of damper means 5 in response to the pressure sense by pressure plate 2. Damper control means 20 are adapted to maintain a substantially constant volume flow of fluid through conduit 3 under conditions of changing flow pressures and changing flow velocities.

In the present exemplary embodiment of my invention as shown in detail in FIG. 2 and as shown schematically in FIG. 4, pneumatic means responsive to movement of pressure plate 2 and also responsive to mechanical energy from a transducer means 32, as hereinafter explained, are provided for controlling the operation of inflatable damper means 5. The pneumatic means includes a pneumatic supply line 8 from a source of approximately 20 p.s.i. pneumatic pressure (not shown). Pneumatic supply line 8 is provided with an inlet pressure regulator 9 which reduces the pneumatic pressure beyond that point preferably to approximately 5 p.s.i. Safety restrictors 41 and 41a are disposed in line 8 to limit the cross-sectional area of pneumatic supply line 8, for purposes which will be discussed later. Pneumatic supply line 8 is connected directly to inflatable damper means 5 via pneumatic inlet 7. Pneumatic supply line 8 is also connected through electric solenoid operated shut-off means 15 to damper control means 20. This connection is best seen with reference to FIG. 2 where pneumatic supply line 8 is seen to be connected to a tubular fitting 22 which is provided with an outlet aperture 22a which functions as a bleed port. Outlet aperture 22a is positioned proximate a seat 23 which is attached to arm 10 of pressure plate 2 for rotation therewith.

In operation, as pressure plate 2 is urged to the left (as viewed in FIG. 2) by the force of fluid flow through conduit 3 from right to left, arm 10 is rotated in a generally counter-clockwise direction about pivot 24. As arm 10 rotates, seat 23 is moved to the right and is, as a result, positioned more closely adjacent aperture 22a of fitting 22. As the distance between seat 23 and aperture 22a is decreased, the rate of flow of pneumatic fluid through aperture 22a is decreased until such time as aperture 22a is completely closed. Referring once again to schematic FIG. 4, when aperture 22a is partially closed, pneumatic supply line 8 with partial bleeding of pressure through aperture 22a is connected directly to pneumatic inlet 7 of inflatable damper means 5 being ultimately subject only to the control of damper safety means 11 (to be described hereinafter). This condition results in an inflation of damper means 5 which reduces the velocity of fluid flow through conduit 3. As the velocity of fluid flow through conduit 3 decreases in response to this inflation, the force on pressure plate 2 is reduced, and pressure plate 2 tends to return to a position which is determined by a previously selected biasing adjustment of adjustable means 22 in conjunction with a biasing spring 25 to be described in detail hereinafter.

As pressure plate 2 is urged to the right under the influence of biasing spring 25, arm 10 rotates in a clockwise direction. As arm 10 rotates in a clockwise direction, seat 23 is moved away from aperture 22a of fitting 22. When this occurs, aperture 22a operates as a greater capacity bleed port. This results in the greater venting of pneumatic supply line 8 through aperture 22a and a consequent reduction of pneumatic pressure at pneumatic inlet 7 of damper means 5. Being elastic in nature as stated, damper means 5 tends to deflate in response to the reduction in pneumatic supply line pressure which, in turn, reduces the restriction to fluid flow through conduit 3. As the restricting effect is reduced, the fluid flow velocity tends to increase, pressure plate 2 is urged to the left, arm 10 is rotated counter-clockwise again, and seat 23 is brought closer to contact with aperture 22a of fitting 22. Under substantially constant conditions, an equilibrium is ultimately attained which remains until one of the variables changes. At such time, the above-described rebalance procedure is once again accomplished to bring the system back into equilibrium.

As will be noted, damper safety means 11 are provided to prevent damage to inflatable damper means 5 should damper control means 20 attempt to force (inflate) damper means 5 past a fully closed position. The relationship between damper safety means 11 and damper means 5 is shown schematically in FIGS. 1 and 3. Damper safety means 11 is operationally interconnected into pneumatic line 8 between inlet pressure regulator 9 and pneumatic inlet 7 of damper means 5. Damper safety means 11 is disposed to sense the inflation level of damper means 5 which will fully close conduit 3. Upon inflation of damper means 5 beyond that point, a damper bleed valve 12, which is operationally interconnected to and operated by damper safety means 11, is opened to completely vent pneumatic supply line 8 and, thereby, prevent the overinflation of damper means 5. As damper means 5 is thereby, in effect, connected to an opened line, damper means 5 quickly deflates until damper safety means 11 senses a safe inflation level. At that time, damper bleed valve 12 is closed permitting damper means 5 to be reinflated in its normal manner.

As best seen in FIG. 2, damper control means 20 includes adjustable means indicated generally at 21 for adjusting and varying the value of the constant volume flow being divided. Adjustable means 21 comprises the biasing spring 25 interconnected between an anchor 29 carried by a bias arm 37 and a bias spring link 28 which is, in turn, mounted to an adjustable mount 28a carried by a housing assembly 26. Adjustable mounting means 27 and 27a secure housing assembly 26 to arm 10. As adjustable mount 28a is tightened away from anchor 29, the spring tension in biasing spring 25 is increased. Likewise, loosening adjustable mount 28a decreases the tension in biasing spring 25. This permits a predetermined selection and adjustment of the biasing force exerted by biasing spring 25 upon pressure plate 2 through arm 10. Adjusting the biasing force, of course, varies the response of pressure plate 2 to changes in flow pressure.

Adjustable means 21 may be provided with manual means such as threaded bolt 21a in threaded engagement with housing 26 and connected to adjustable mount 28a for pre-selecting an initial value of constant volume flow through conduit 3 to zone 4. In the exemplary embodiment shown in FIG. 2, bolt 21a may be withdrawn from housing assembly 26 by a counterclockwise rotation of bolt 21a. As bolt 21a is withdrawn, adjustable mount 28a, which is attached to bolt 21a, is moved further from anchor 29. This movement increases the tension in biasing spring 25 and the resultant force exerted thereby upon arm 10 of pressure plate 2 is increased proportionally. Any increase in the force exerted upon arm 10 by biasing spring 25 tends to urge arm 10 of pressure plate 2 to rotate in a clockwise direction about axis 24. This rotation tends to move pressure plate 2 in a direction counter to the direction of flow of fluid through conduit 3. The net result of this resistive force on pressure plate 2 is to increase the force which is required to be exerted against pressure plate 2 by the flow of fluid through conduit 3 and past pressure plate 2 before pressure plate 2 initiates a response by damper control means 20. Clockwise rotation of bolt 21a will, of course, have the opposite effect.

Temperature responsive means are also associated with the aforedescribed damper control means for sensing the temperature of fluid which has reached zone 4 and for varying the constant value at which the control means is operated in response to changes in temperature of fluid in zone 4. In the exemplary embodiment of FIGS. 1–4, such means include thermostatic means 31 for sensing the temperature of fluid in zone 4 (as is shown schematically in FIG. 4) and transducer means 32, associated with thermostatic means 31, for converting thermal energy variations sensed by thermostatic means 31 into mechanical energy to vary the operation of the damper control means as a function of the temperature in zone 4.

As seen in FIG. 4, thermostatic means 31 is connected to vent another branch of pneumatic supply line 8 to, thereby, operate the transducer means 32 connected to said branch of line 8 as hereinafter explained. A bleed port 13 is associated with and controlled by thermostatic means 31. Thermostatic means 31 is located within a zone 4 located at an outlet of conduit 3 to be conditioned by constant temperature fluid emerging therefrom. In an embodiment wherein the fluid flow consists of refrigerated air, thermostatic means 31 initiates a response by damper control means 20 to limit the volume of fluid flow once thermostatic means 31 senses a temperature which is below a pre-determined temperature setting at thermostatic means 31. By contrast, if the fluid flow were to consist of heated air, thermostatic means 31 would initiate a response by damper control means 20 to limit the volume of fluid flow once thermostatic means 31 sensed a temperature above the predetermined temperature setting at thermostatic means 31. In the present description, it is assumed that the fluid flow consists of refrigerated air.

In the present system, it will be seen that, in order to initiate a fluid flow limiting response by damper means 5, bleed port 13 must be closed by thermostatic means 31 once the temperature in zone 4 reaches a level below a pre-selected temperature. With bleed port 13 in a closed configuration, pneumatic supply line 8 is unvented and pneumatic pressure is applied to transducer means 32 as is apparent from schematic FIG. 4 and is shown in detail in FIG. 2.

In the exemplary embodiment shown in FIG. 2, transducer means 32 comprises a diaphragm (not shown) within a diaphragm housing 33. The diaphragm is responsive to input pressure from line 8 in conjunction with bleeding thermostatic means 31 which actuates a plunger 36 connected thereto initiating an axial linear movement or thrust of plunger 36 to the right. Transducer means 32 is mounted to housing 33 by mounting means 34. Plunger 36 is positioned adjacent bias arm 37 which is mounted for rotation about a pivot 37a. As the diaphragm within diaphragm housing 33 responds to increases in pneumatic pressure, plunger 36 is actuated to move bias arm 37 counter-clockwise as shown by the ghosted positions in FIG. 2. Plunger 36 is retained in operational contact with bias arm 37 to move therewith by counter-biasing spring 38 so that the mechanical energy thrust of plunger 36 responding to temperature changes in zone 4 varies the adjustment of adjustable means 21 and, thereby, changes the value of constant volume fluid through conduit 3 to zone 4 in response to changes in the temperatures sensed by thermostatic means 31. As can be seen, as plunger 36 moves in an axial linear direction, bias arm 37 is rotated about pivot 37a. This rotation of bias arm 37 causes anchor 29 to move closer to or further from bias spring link 28 and adjustable mount 28a. This movement results in a corresponding decrease or increase in tension within biasing spring 25, resulting in a decrease or increase in the resistance to movement by pressure plate 2 under the influence of fluid flow through conduit 3. The change in the sensitivity of pressure plate 2 to fluid flow velocity through conduit 3 which occurs as a result of the aforesaid change in resistance to movement by pressure plate 2 results in a closure of aperture 22a of fitting 22 at a different velocity of fluid flow through conduit 3 then would be customary without the influence of thermostatic means 31 i.e. an adjustment as a function of the variable-temperature.

As can be seen, counter-biasing spring 38 is mounted between a pair of spring mounts 39 and 39a to assure a constant operational contact between plunger 36 and bias arm 37 while preventing loss of counter-biasing spring 38. Counter-biasing spring 38 is selected to be relatively stronger than biasing spring 25 but not so strong as to overcome the force exerted by transducer means 32 and plunger 36 on bias arm 37.

As the flow of refrigerated air through duct 3 is reduced by damper means 5, the temperature within zone 4 tends to rise toward the control temperature previously selected at thermostatic means 31. As thermostatic means 31 senses the higher temperature, bleed port 13 is opened, the pneumatic pressure to transducer means 32 reduced, the force transmitted to plunger 36 by transducer means 32 is also reduced, counter-biasing spring 38 tends to overpower the effect of plunger 36 upon bias arm 37, bias arm 37 is forced to the left, and anchor 29 is moved further from bias spring link 28 and adjustable mount 28a. This movement results in an increase in tension within biasing spring 25, resulting in an increase in the resistance by pressure plate 2 to movement under the influence of fluid flow through conduit 3. The resulting decrease in the sensitivity of pressure plate 2 to fluid flow velocity through conduit 3 results in aperture 22a of fitting 22 remaining opened at a higher velocity of fluid flow through conduit 3 than would be customary without the influence of thermostatic means 31. Further, this resistance to the closing of aperture 22a allows fitting 22 to function as a bleed port for a longer period of time, thereby preventing the inflation of damper means 5 by pneumatic supply line 8 until sufficient refrigerated air has flowed into zone 4 to once again cause the thermostatic means 31 to cease its override function with respect to damper control means 20. At such time, damper control means 20 once again responds solely to changes in fluid flow velocity through conduit 3, as sensed by pressure plate 2.

In pneumatically operated systems according to the present invention, it is preferred that safety means be provided for preventing damage to the fluid flow control valve due to pressure irregularities within pneumatic supply line 8. In the exemplary embodiment of FIGS. 1-4, the pneumatic safety means comprise safety restrictors 41 and 41a located within pneumatic supply line 8 at points intermediate pneumatic inlet regulator 9 and damper means 5, damper control means 20, thermostatic means 31 and transducer means 32. Safety restrictors 41 and 41a limit the cross-sectional area of pneumatic supply line 8. Bleed port means associated with pressure plate 2, which comprise fitting 22 and aperture 22a, bleed port 13 which is associated with thermostatic means 31, and damper bleed valve 12 associated with damper safety means 11 are all provided for variable and selectably venting pneumatic supply line 8. Safety restrictors 41 and 41a are sized to have an internal cross-sectional area less than any of the aforementioned bleed ports. In operation, safety restrictors 41 and 41a prevent the passage of a sufficient quantity of pneumatic fluid to pneumatic supply line 8 to damage any of the elements of the fluid flow control valve of the present invention as any of the bleed ports within the system is adequate to completely vent pneumatic supply line 8 beyond safety restrictors 41 and 41a.

In addition to the pneumatic embodiment of the present invention described heretofore, an electrical embodiment is provided which is shown schematically in FIG. 5. Electrical means responsive to pressure plate 102 and also responsive to mechanical movement of transducer means 132 is provided for controlling the operation of damper means 105. The electrical means is typically connected as shown to a standard electrical circuit, having a hot (H) side and a ground (G) side, which is capable of supplying appropriate operating voltages. In a manner similar to the pneumatic embodiment previously described, pressure plate 102, connected to arm 110 which is rotatably mounted to pivot 124, is positioned within conduit 103 for sensing the flow pressure of fluid (again represented by the dashed arrows) through conduit 103 to zone 104. Damper means 105 is provided for adjustably restricting the flow of fluid through conduit 103 and damper control means 120 is provided for controlling the operation of damper means 105 in response to the pressure sensed by pressure plate 102, thereby maintaining a substantially constant volume flow of fluid through conduit 103. Damper control means 120 includes adjustable means 121 for adjusting the value of constant volume flow being provided. Again, as in the pneumatic system, adjustable means 121 comprises adjustable biasing spring 125 for biasing pressure plate 102 in a pre-determined and adjustable manner to vary the effect on damper means 102 in response to changes in fluid flow pressure. In the electrical embodiment of the present invention, damper control means 120 further comprises bidirectional electrical motor means 141 for operating damper means 105 which, contrary to the pneumatic embodiment discussed prior, comprises a rotatable circular damper blade.

In operation, when pressure plate 102 senses changes in fluid flow velocity through conduit 103, arm 110 is rotated about pivot 124. Micro-switch means 122 are provided to detect responses of arm 110 to excessive fluid flow velocity through conduit 103. As arm 110 is rotated in a counter-clockwise direction by the influence of excessive fluid flow pressure against pressure plate 102, a portion of arm 110 contacts micro-switch 122 which operates electrical motor means 141 in a counter-clockwise or closing direction. As motor means 141 rotates rotatable damper means 105 counter-clockwise into a closed position, wheel 137 which is coaxially mounted upon shaft 138 of rotatable damper means 105 is rotated in a counter-clockwise direction therewith. As shown in detail in FIGS. 6 and 7, in rotating in this manner, wheel 137 tends to shorten a cable section 129 which is attached to one end of biasing spring 125. This effective shortening of cable 129 increases the spring tension within biasing spring 125 thereby increasing the resistance of arm 110 to counter-clockwise rotation under the influence of fluid flow pressure against pressure plate 102. This tends to cause arm 110 to move away from micro-switch 122 and, as damper means 105 is rotated somewhat under the influence of motor means 141 and fluid flow velocity through conduit 103 is reduced thereby, the tendency is for arm 110 to move away from micro-switch 122 to a neutral or equilibrium position where it remains as long as conditions remain constant.

Upon a lowering of the velocity of fluid flow through conduit 103, arm 110 is rotated in a clockwise direction by the influence of biasing spring 125, a portion of arm 110 contacts a second micro-switch 122a which operates electrical motor means 141 in a clockwise direction, and motor means 141 rotates rotatable damper means 105 clockwise into a more opened position. Wheel 137 is also rotated in a clockwise direction and, in so doing, tends to lengthen cable section 129 which, as mentioned, is attached to one end of biasing spring 125. This effective lengthening of cable 129 decreases the spring tension within biasing spring 125 thereby decreasing the resistance of arm 110 to clockwise rotation under the influence of fluid flow pressure against pressure plate 102. This tends to cause arm 110 to move away from micro-switch 122a and, as damper means 105 is rotated somewhat under the influence of motor means 141 thereby allows fluid flow velocity though conduit 103 to be slightly less restricted and thereby increase, the tendency is for arm 110 to move away from micro-switch 122a into a neutral position again.

As is apparent from the foregoing discussion, any fluctuations in fluid flow velocity through conduit 103 are effectively counteracted by damper means 105 acting in response to damper control means 120. The resultant fluid flow through conduit 103 past the fluid flow control valve of the present invention is maintained within a substantially constant value of fluid flow volume.

As was discussed in the reference to the pneumatic embodiment prior, in the present invention the damper control means 120 may be overridden by the associated temperature responsive means. In the electrical embodiment shown in FIG. 5, the temperature responsive means comprise thermostatic means shown generally at 131 for sensing the temperature of fluid in zone 104 and transducer means 132 associated with thermostatic means 131 for converting thermal energy variations sensed by thermostatic means 131 into mechanical movement. Switch means 133 and 133a are operated by the mechanical movement of transducer means 132 and vary the adjustment of adjustable means 121 to change the value of constant volume fluid flow in response to changes in temperatures sensed by thermostatic means 131.

In this embodiment, as thermostatic means 131 senses a temperature within zone 104 which is below the preselected value at which thermostatic means 131 is set, transducer means 132, which may comprise a bimetallic strip, moves to contact switch 133. This completes a circuit to electrical motor means 141 which initiates a "closed" response therefrom. Motor means 141 rotates rotatable damper means 105 in a counter-clockwise direction, thereby winding cable section 129 about wheel 137 and effectively shortening the length of cable section 129 which is attached to one end of biasing spring 125 as shown in FIGS. 5-7. This effective shortening of cable 129 increases the spring tension within biasing spring 125 and, thereby, increases the resistance of arm 110 to counter-clockwise rotation under the influence of fluid flow pressure against pressure plate 102. This "override" continues regardless of fluid flow velocity against pressure plate 102 until such time as the temperature in zone 104 returns to the pre-selected value, at which time transducer means 132 ceases to contact switch 133. The electrical circuit to the closed side of the electrical motor means 141 is then broken and control of damper means 105 is returned to damper control means 120.

Again in a manner similar to the pneumatic embodiment previously discussed, safety switch 111 is provided for preventing damage to damper means 105 should damper control means 120 attempt to force damper means 105 past a fully closed position. Electrical switch 11 is positioned to contact damper blade 105 when damper blade 105 reaches a fully closed position. Upon contact with damper blade 105, switch 111 completes an electrical circuit to the "open" side of electrical motor means 141 and damper means 105 is rotated toward an opened position. Upon rotation of damper means 105, contact between damper means 105 and switch 111 is broken and control of damper means 105 is returned to damper control means 120 until such time as damper means 105 again returns to a completely closed position.

Having thus described the operation of the present invention with reference to simplified pneumatic and electrical embodiments thereof, the preferred embodiment as presently contemplated can be described with particular reference to FIGS. 8 and 9. To provide the desired action, a mechanical housing 210 is mounted on the outside of duct 203. A pivot arm 212 is mounted to housing 210 by a pivot pin 214 passing through pivot arm 212 and mechanical housing 210. Pivot pin 214 thus provides an axis of rotation normal to the longitudinal axis through duct 203. A suitable opening 211 is made in the wall of duct 203 to allow pivot arm 212 to pass to the interior of duct for rotational movement about pivot pin 214. A shaped vane 216 is attached to the end of pivot arm 212 interior of duct 203 to be disposed substantially across the entire interior diameter of duct 203. Shaped vane 216 is disposed to provide mechanical movement in response to the average velocity pressure across the interior of duct 203 caused by the flow of fluid therethrough. As can be seen, shaped vane 216 is tapered from a maximum width adjacent pivot pin 214 to a narrower portion on the end opposite pivot pin 214. Shaped vane 216 is tapered thus to provide an equal mechanical advantage throughout its length. That is, the velocity force of the moving fluid at any distance along vane 216 must produce the same results to the mechanical linkage to be hereinafter described as a like force at any other distance along vane 216. This can be accomplished by making the product of the distance D to any point P on vane 216 times the width W at said point a constant. That is:

$$D \times W = \text{Constant}$$

In a tested embodiment of the present invention as applied to a six-inch internal diameter duct, vane 216 was tapered from the maximum width T adjacent the opening 211 toward the minimum width B at the opposite end to give a total area of 5 square inches. This area provided preferred results in combination with springs rated at 0.78 pounds per inch of compression employed as springs 218 and 220 to be hereinafter described. The same area of vane 216 can be employed with satisfactory results in other size ducts with the same springs by adjusting the widths T and B. If the area of the vane 216 is changed more than an insignificant amount, the compression rating of the springs 218 and 220 should be changed as well. In the tested embodiment referred to above, the length L has been found to work well when made 0.5 inches less than the diameter of the duct to provide averaging across the duct while providing clearance for movement without binding. As thus configured and employed, the shaped vane 216 can best be described as an "air velocity averaging vane".

The other end of pivot arm 212 is mounted between a pair of springs 218 and 220. When viewing FIG. 8, spring 218 is rigidly mounted on one end to a bracket 222 to, thereby, tend to rotate pivot arm 212 in a clockwise direction. Spring 220, on the other hand, is mounted on its opposite end to a swing arm 224 adapted for limited rotational movement about a pivot 226 disposed at the top of housing 210. Thus, by adjusting the position of swing arm 224, spring 220 can be made to tend to rotate pivot 212 in a counter-clockwise direction with more or less force. Between the place of attachment of springs 218 and 220 to pivot arm 212 and the position of pivot pin 214, a rubber seat 228 is attached for sealably mating with a bleed opening 230 of a pneumatic line 232 connected to operate a pneumatic motor 231 connected to operate damper 234 in response to opening and closing of bleed opening 230 by rubber seat 228 according to the manner hereinbefore described. In the preferred embodiment as tested in actual use, the damper motor 231 operating damper 234 is a pneumatic motor manufactured by Honeywell, Inc. and designated as a model MP 909D. As can be seen, the opening and closing of damper 234 is controlled by the interaction of springs 218 and 220. Spring 218 provides a constant bias tending to maintain rubber seat 228 against bleed opening 230. Thus, spring 218 tends to assist vane 216 in closing bleed opening 230 in response to the flow of fluid through the duct 203. The sizing of spring 218 vis-a-vis the cross-sectional area of vane 216 dictates the sensitivity of the control system. As previously mentioned, in a successfully tested embodiment of the present invention, as applied to a six-inch interior diameter duct, vane 216 was sized to have a total area of five square inches in combination with springs 218, 220 having 0.78 lb/in. ratings.

The opposing force tending to open bleed opening 230 by rotating pivot arm 212 counter-clockwise from its at rest position is dictated by the sizing of the spring 220 and the compression to which it is subjected. Since one end of spring 220 is carried by pivot arm 212, the compression on spring 220 is dictated by the positioning of swing arm 224. The minimum flow volume point is set by a threaded rod 236 which is threadedly engaged with housing 210 for longitudinal movement by turning knob 238 attached thereto. Thus, by employing a standard thread, threaded rod 236 moves to the left or into mechanical housing 210 upon clockwise rotation of knob 238 to thereby increase the compression on spring 220. It will be apparent that, therefore, turning knob 238 counter-clockwise decreases the compression on spring 220 by causing threaded rod 236 to retract out of mechanical housing 210. With nothing more, therefore, the heretofore described portions of the preferred embodiment of FIGS. 8 and 9 would provide a novel and improved method for maintaining a constant volume flow of fluid through conduit 203 as established by the positional setting of threaded rod 236.

Through the additional mechanical apparatus shown in FIGS. 8 and 9, however, the present invention as disclosed therein is particularly suited for maintaining variable constant volume flows of fluid modifiable under the actions of a thermostatic transducer to control the temperature of a zone being provided fluid by the duct 203. To this end, a pneumatic motor 240 is mounted to housing 210 with the longitudinal actuator thereof passing through the side of housing 210 for connection interior thereof. In the tested embodiment previously mentioned, superior results were obtained for pneumatic motor 240 by the use of a motor also manufactured by Honeywell, Inc. and sold under the name Mini-Motor Model MP 913. Pneumatic motor 240 is connected to operate in the manner of transducer means 32 of FIG. 4. Thus, as the thermostatic means (not shown) connected thereto through pneumatic line 241 reacts to changes in temperature within the controlled zone, actuator 242 moves longitudinally to the left or right.

To provide the desired thermostatic response, a second swing arm 244 is mounted from a pivot 246 along the top of housing 210 to provide limited rotational movement thereabout in the manner of first swing arm 224. The opposite end of swing arm 244 is mounted between a pair of springs 248 and 250 carried by a bolt 252 passing through springs 248, 250 and an appropriately located hole 254 in swing arm 248 into threaded engagement with actuator 242. Hole 254 is sized to be a clearance hole for the threads of bolt 252. Thus, as actuator 242 moves laterally to the left and right, swing arm 244 is carried in rotational movement therewith by the equal and opposite compression forces of springs 248 and 250. Should the rotational movement of swing arm 244 be impeded in any manner, however, actuator 242 is able to continue its longitudinal movement to the left or right in response to the temperature variation signal thereto by the appropriate compression of spring 248 or 250. Additionally, swing arms 224 and 244 are pivotally interconnected by a link arm 256. Assuming once again the previous condition of controlling refrigerated air, as the temperature sensed goes lower, pneumatic motor 240 is caused to extend actuator 242 a greater distance. That is, actuator 242 moves from the left to the right in FIG. 8. The left to right movement of actuator 242 imparts a counter-clockwise rotational force against swing arm 244. The counter-clockwise rotational force on swing arm 244 is translated into a corresponding counterclockwise rotational force in swing arm 224 through the interconnection of link arm 256. The counter-clockwise movement of swing arm 224 results in less compression on spring 220. Thus, less pressure is required on vane 216 to close bleed opening 230. As a consequence, damper 234 is closed until the equilibrium condition is reached with less cold air flow through duct 203—which is the desired result.

The preferred embodiment as heretofore described can be related for purposes of operable connection to the simplified pneumatic embodiment of FIG. 4. In the preferred embodiment, pneumatic motor 240 replaces transducer means 32 with pneumatic line 241 being equivalent to that portion of the pneumatic line 8 connected to thermostatic means 31. In similar fashion, bleed opening 230 corresponds to aperture 22a and damper motor 231 corresponds to inflatable damper means 5. In the present preferred embodiment the pressure in pneumatic line 232 connected to damper motor 231 as controlled by bleed opening 230 positionally moves blade damper 234 rather than inflating an inflatable member accomplishing the same results. As will be understood, the preferred control apparatus described could be employed to control an inflatable damper as well. That is, while not preferred, inflatable damper means 5 of FIGS. 1-4 could replace damper motor 231 and damper 234.

A few additional considerations are worthy of note in relation to the preferred embodiment as heretofore described. As will be noted, the point of pivotal attachment of link arm 256 to swing arms 244 and 224 is at a different distance ($d_1$ and $d_2$ respectively) from the corresponding pivot points 246 and 226. The longitudinal travel of actuator 242 for a particular motor 240 is fixed. The swing arm 244, therefore, is rotated a given distance for each degree of change in temperature. To change the response by the amount desired, spring 220 must be decompressed or compressed a given distance. The ratio of $d_1$ to $d_2$ dictates the change in length of spring 220 (therefore, change in volume of fluid through duct 203) to be effected in response to each given change in longitudinal position of actuator 242 (corresponding to a given change in temperature). As can be seen, the ratio of $d_1$ to $d_2$ is an easily calculated quantity which depends on the operating elements employed in any particular constructed embodiment. For adjustment to varying operating conditions, the swing arms may be provided with adjustable mountings for link arm 256 such as the slots 245.

Additionally, it should be noted that, in the embodiment of FIG. 8, swing arms 244 and 224 are directly linked to move in combination. Actuator 242 extends in response to increasing temperature which action is caused by an increase in pressure in line 241. This action provides compliance with code requirements in many locations which requires a "duct open" fail-safe condition in the event of loss of pneumatic pressure. As can be seen, loss of pressure in line 241 would cause actuator 242 to move into motor 240 the maximum amount (pressure extending/spring returning). This would subject spring 220 to the maximum compression by swing arm 224 which would cause damper 234 to be opened to its maximum position in an effort to have vane 216 close bleed opening 230. Should the opposite action be desired, swing arm 244 can be double pivoted to provide reverse operation (i.e. actuator 242 extending on decrease in pressure). The required modifications are shown in FIG. 10. Swing arm 244 is changed to an articulated form having an upper portion 244' and a lower portion 244". Lower portion 244" has actuator 242 attached thereto in the same manner as before and, simiaarly, upper portion 244" has link arm 256 connected thereto. Upper and lower portions 244' and 244" are pivotally linked by a pivot 247. Additionally, lower portion 244" is pivotally attached to housing 210 by a pivot 249 about which it can rotate. As can be seen by the arrows in FIG. 10, as actuator 242 extends to the right lower portion 244" is rotated counterclockwise about pivot 249 which moves upper portion 244' clockwise about pivot 246. This, of course, pulls link arm 256 (and swing arm 224 connected thereto) to the left—which is the desired reverse action.

Returning now to the description of the swing arm 256 of FIG. 8, a second threaded rod 258 and knob 260 are provided in threaded engagement with mechanical housing 210 for lateral movement parallel to the line of movement of actuator 242 so as to contact swing arm 244 to limit its movement in the clockwise direction. By so doing, threaded rod 258 and knob 260 act as a high volume adjustment to limit the maximum velocity flow through duct 203. Thus, it can be seen that the present invention provides both low volume and high volume adjustments for the volume of fluid capable of passing through the duct 203 in the form of threaded rods 236 and 258 respectively.

In the present invention, it is desirable that any embodiment thereof be provided with shut-off means, shown at 16 in FIG. 4 and at 116 in FIG. 5, operationally interconnected with a light circuit to operate damper means, shown at 5 in FIG. 4 and 105 in FIG. 5, to a fully opened or closed position in conjunction with the use of the light circuit, thereby overriding both the pressure plate damper control means and the thermostatic means. For example, as may be seen in the schematic representation of a pneumatic system in FIG. 4, upon closing shut-off means 16, solenoid 17 can be actuated and shut-off valve 15 closed, thereby taking damper control means 20 out of operation. As temperature responsive means 30 is only capable of modifying the operation of damper control means 20, and is not capable of affecting damper means 5 by itself, it may be seen that damper means 5 is directly connected to pneumatic supply line 8. When this situation occurs, damper means 5 is fully inflated and remains fully inflated subject only to the control of damper safety means 11 and damper bleed valve 12.

Applying a similar example to the electrical embodiment shown in FIG. 5, upon actuating switch 116, a circuit is completed to the "closed" side of electrical motor means 141. This circuit continues to operate electrical motor means 141 to close rotatable damper means 105 irrespective of any changes in temperature sensed by thermostatic means 131 or any changes in flow velocity sensed by pressure plate 2. Motor control means 141 is only subject to control by damper safety means 111 which prevents damper means 105 from being rotated past the fully closed position. Additionally, it is desirable to have a second electrical actuating switch 117, provided to allow the occupant of a room to complete a circuit to the "open" side of electrical motor 141. This allows a complete manual override of the flow control valve in conditions which require a maximum fluid volume input to zone 104. As can be seen, the foregoing override features of the present invention allow the present invention to not only provide improved constant volume fluid flow and constant volume fluid flow variable in response to temperature changes in a zone being controlled by the control apparatus, but additionally, allow an operator to simply and easily override the operation of the control apparatus for periods of time so as to provide either maximum or minimum amounts of fluid flow into the zone in response to special requirements.

Having thus described my invention in its exemplary and preferred embodiments, I claim:

1. In fluid delivery systems having a duct for directing fluid from a pressurized source into a space to be conditioned by the fluid including a movable damper within the duct for regulating the flow of fluid, motive means for positioning the damper, and a sensor in the space providing a first signal proportional to the state of the variable to be conditioned by the fluid, the improved controller for positioning the damper to provide fixed volumes of fluid flow through the duct comprising:
    (a) means operably connected to the duct for providing a second signal proportional to the average across the diameter of the duct of the flow of fluid therethrough;
    (b) adjustable means for providing a third signal proportional to a basic system offset; and,
    (c) summing means having said first, second, and third signals as inputs thereto and an output connected to drive the damper motive means for positioning the damper as a function of said first, second and third signals whereby the space is conditioned with the variable maintained at a preselected value.

2. The fluid flow controller claimed in claim 1 wherein said second signal providing means includes:
    (a) a movable vane disposed across the diameter of the duct;
    (b) means for biasing said vane against movement by the flow of fluid through the duct; and,
    (c) means for sensing the position of said vane and for varying said second signal as a function of said position.

3. The fluid flow controller claimed in claim 2 wherein:
    (a) said vane is mounted for rotational movement about an axis normal to the longitudinal axis of the duct adjacent one wall of the duct; and,
    (b) said vane is shaped to provide a constant mechanical advantage across the duct to the fluid flowing therethrough.

4. In fluid flow apparatus having a conduit for conducting flowing fluid, a movable damper disposed within the conduit for varying the cross-sectional area of the conduit, and an actuator connected to the damper for opening the damper to increase the cross-sectional area of the conduit and closing the damper to decrease the cross-sectional area of the conduit, apparatus for maintaining the volume of fluid flowing through the conduit constant comprising:
    (a) a vane disposed across the diameter of the conduit adapted for movement from an at rest position in a first direction as a function of the average force across the diameter of the conduit of the fluid flowing therethrough;
    (b) bias means connected to said vane for biasing said vane in a second direction opposite said first direction by a preselected amount of force whereby said vane is disposed in said at rest position when the average force of the flowing fluid across the diameter of the conduit on said vane is less than said bias force; and,
    (c) controller means having means for designating the desired flow volume through the conduit, means for sensing the position of said vane, and an output connected to the damper for opening the damper when the fluid flow is less than said desired flow volume and for closing the damper when the fluid flow is greater than said desired flow volume whereby the average flow volume across the diameter of the conduit of the fluid through the conduit is maintained equal to said desired flow volume.

5. The flow controller apparatus claimed in claim 4 wherein:
    said means for designating the desired flow volume through the conduit is adjustable and adapted for connection to and adjustment by a transducer responsive to a variable fluctuating as a function of the volume of fluid flow through the conduit.

6. The flow controller apparatus claimed in claim 4 wherein:
    (a) said vane is adapted for pivotal movement about an axis normal to the longitudinal axis of the conduit disposed adjacent the wall of the conduit; and,
    (b) said vane is tapered in a plane passing through said axis of rotation to be wider adjacent said axis of rotation such that the product of the distance from said axis of rotation to any point on said vane times the width of said vane at said point is a constant whereby the flowing fluid across the diameter of said conduit tends to rotate said vane with constant mechanical advantage to produce rotation of said vane as a result of the average fluid flow across the diameter of said conduit.

7. In a pneumatically operated damper controller for positioning a damper disposed to control the flow of fluid through a conduit having a pneumatic motor connected to position the damper as a function of the pressure within a pressurized pneumatic line connected to the pneumatic motor, the improved controller for maintaining the volume of fluid flowing through the conduit constant comprising:
    (a) a bleed member connected into the pneumatic line connected to the pneumatic motor including a bleed orifice for bleeding fluid from the pneumatic line to reduce the pressure therein;
    (b) a movable member including a seat adapted for movement between a first position wherein said orifice is closed by said seat and a second position wherein said orifice is open to its full bleed capacity;
    (c) a first bias means connected to said movable member for biasing said movable member toward said first position;
    (d) a second bias means connected to said movable member for biasing said movable member toward said second position, said second bias means being adapted to overcome said first bias means whereby said movable member is biased in said second position by a bias force equal to the difference between the bias forces of said first and second bias means; and,
    (e) a movable vane disposed within the conduit to respond to the pressure of fluid flowing therethrough, said vane being operably connected to said movable member to move said movable member toward said first position in response to increases in pressure of the fluid flowing through the conduit thereby positioning said seat relative to said orifice so that the fluid bleeding therefrom causes the pressure in the pneumatic line to the pneumatic motor to be an amount to position the damper to limit the flow of fluid through the conduit to an amount which puts the system in equilibrium whereby the constant flow volume of fluid flowing through the conduit is proportional to the difference between said first and second bias forces.

8. The controller claimed in claim 7 and additionally comprising:
means for adjusting the bias force of said second bias means whereby said constant flow volume of fluid flowing through the conduit is adjustable.

9. The controller claimed in claim 7 and additionally comprising:
a transducer having an input adapted to sense a variable and a mechanical output positionally disposed as a function of said variable being sensed by said input, said output being connected to modify the bias force of said second bias means whereby said constant flow volume of the fluid flowing through the conduit is modified as a function of said variable.

10. The controller claimed in claim 9 and additionally comprising:
(a) releasable linking means connecting said output of said transducer and said second bias means; and
(b) adjustable stop means for limiting the motion of said linking means while allowing continued movement of the output of said transducer whereby the upper and lower limits of a range wherein said constant flow volume is modified as a function of said variable are established.

11. The controller claimed in claim 7 wherein:
said movable vane is disposed across substantially the entire diameter of the conduit whereby said vane responds as a fluid velocity averaging vane to the pressure of the average fluid velocity across the diameter of the conduit.

12. The controller claimed in claim 11 wherein:
said vane is hingedly mounted on one end adjacent one side of the conduit and tapered toward the other end an amount such that the product of the distance D to any point P on said vane from said point of mounting times the width W at said point P is a constant whereby the pressure of the flowing fluid acting on said vane at any distance D' results in a movement force on said movable member acting through a mechanical advantage identical to that at any other distance D''.

13. The controller claimed in claim 8 wherein:
(a) said second bias means comprises a spring disposed between said movable member and a second movable member; and,
(b) said adjusting means comprises means for positioning said second movable member relative to said movable member to vary the distance therebetween whereby the compression of said spring is changed.

14. The controller claimed in claim 13 and additionally comprising:
(a) a third movable member releasably connected to said actuator output to move longitudinally along an axis parallel to the axis of said spring in response to variations in said variable; and,
(b) a connecting linkage connecting said second and third movable members whereby said second movable member is moved to change the compression on said spring in response to changes in said variable.

15. The controller claimed in claim 4 and additionally comprising:
adjustable stop means for adjustably limiting the movement of said third movable member in the direction which increases the compression on said spring whereby the maximum constant flow volume of fluid in response to a change in said variable is established.

* * * * *

UNITED STATES PATENT AND TRADEMARK OFFICE
CERTIFICATE OF CORRECTION

PATENT NO. : 4,147,298
DATED : April 3, 1979
INVENTOR(S) : Louis J. Leemhuis

It is certified that error appears in the above-identified patent and that said Letters Patent are hereby corrected as shown below:

On the first page of the above-identified patent, please change assignee from "Louis J. Leemhuis, Newport Beach, Calif." to --Air Monitor Corporation, Santa Rosa, California--

Signed and Sealed this

Second Day of October 1979

[SEAL]

Attest:

RUTH C. MASON
Attesting Officer

LUTRELLE F. PARKER
Acting Commissioner of Patents and Trademarks